United States Patent [19]

Kadwell

[11] Patent Number: 5,612,848

[45] Date of Patent: *Mar. 18, 1997

[54] CONTROL DEVICE AND METHODS OF MAKING AND OPERATING THE SAME

[75] Inventor: Brian J. Kadwell, Holland, Mich.

[73] Assignee: Robertshaw Controls Company, Richmond, Va.

[*] Notice: The term of this patent shall not extend beyond the expiration date of Pat. No. 5,440,443.

[21] Appl. No.: 511,818

[22] Filed: Aug. 7, 1995

Related U.S. Application Data

[62] Division of Ser. No. 22,132, Feb. 25, 1993, Pat. No. 5,440,443.

[51] Int. Cl.$^6$ .................................................. H01H 47/04
[52] U.S. Cl. ............................................. 361/160; 361/155
[58] Field of Search ................................. 361/152–156, 361/160; 307/74, 75

[56] References Cited

U.S. PATENT DOCUMENTS

| | | | |
|---|---|---|---|
| 4,631,627 | 12/1986 | Morgan | 361/153 |
| 4,797,779 | 1/1989 | Richards et al. | 361/154 |
| 4,878,147 | 10/1989 | Oyama et al. | 361/154 |
| 4,884,160 | 11/1989 | Pasquarella | 361/154 |
| 5,168,418 | 12/1992 | Hurley et al. | 361/155 |
| 5,440,443 | 8/1995 | Kadwell | 361/155 |

*Primary Examiner*—Fritz Fleming
*Attorney, Agent, or Firm*—Fulbright & Jaworski LLP

[57] ABSTRACT

A control device and methods of making and operating the same are provided, the control device comprising a microcomputer unit, a relay unit having a coil and contacts that are operated to one condition thereof when a direct current flows through the coil, the relay unit having a certain voltage rating, a power supply unit for being interconnected to a high voltage alternating current power supply that has a certain frequency, and a circuit operatively interconnecting the units together, the power supply unit comprising a transformerless capacitor arrangement for creating a low voltage direct current source from the power source to power the microcomputer unit and the coil, the power supply unit comprising an arrangement for creating from the transformerless capacitor arrangement a first low voltage direct current for powering the microcomputer unit and a second low voltage direct current for powering the coil of the relay unit whereby the first low voltage direct current and the second low voltage direct current comprise the low voltage direct current source.

6 Claims, 10 Drawing Sheets

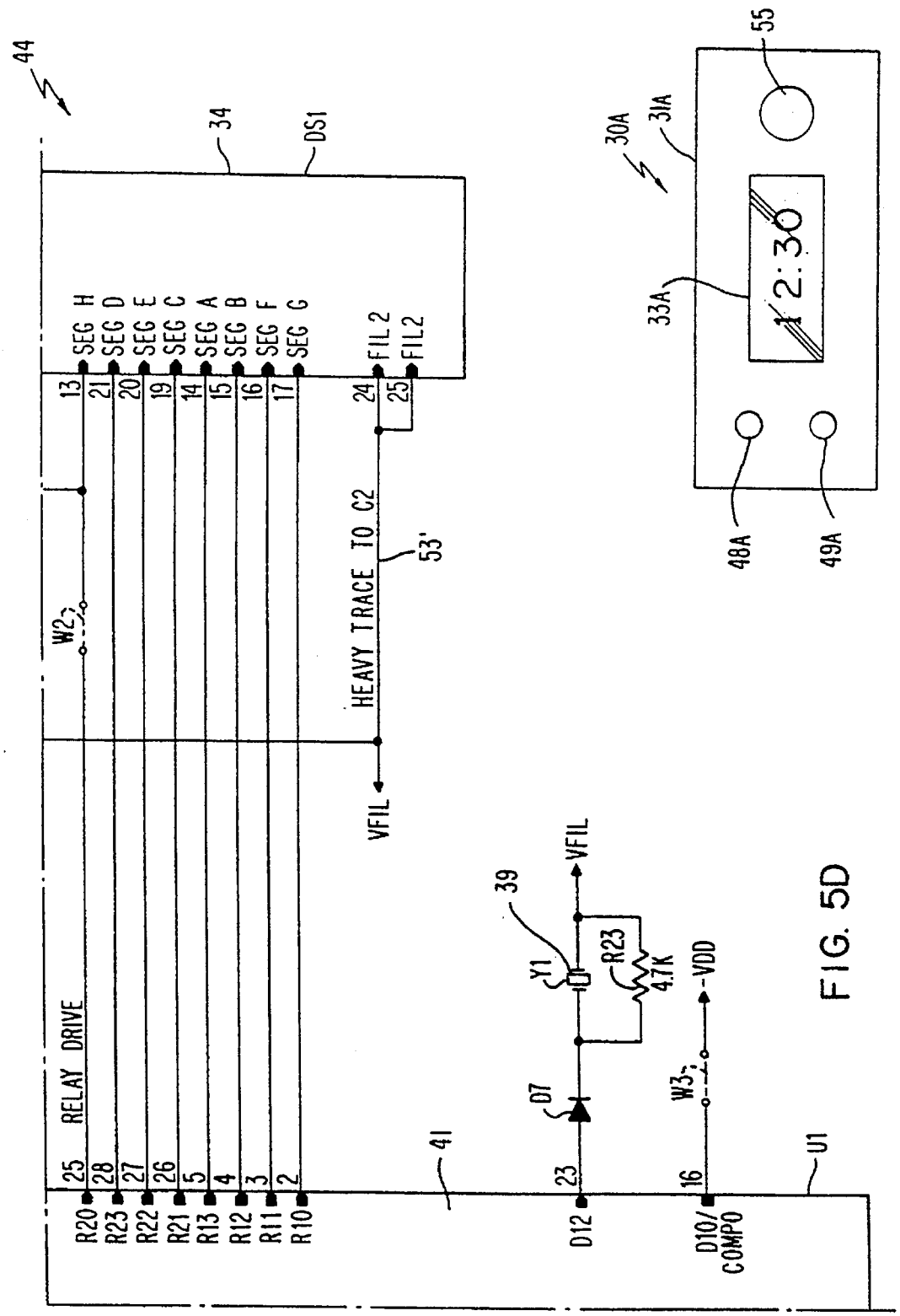

| OPTION | OUT | IN |
|---|---|---|
| D8 | BEEP @ 1 MINUTE SHOW SECONDS | NO BEEP 1 MINUTE |
| D9 | CONTINUOUS E.O.C. | AUTO-STOP E.O.C. |
| D10 | SLEW | ROTARY |
| D11 | 60 HZ | 50 HZ |
| D12 | REGULAR SLEW | TURBO SLEW |
| D13 | 12:00 CLOCK | 24:00 CLOCK |
| W3 | MANUAL DISPLAY PRIORITY | AUTO DISPLAY PRIORITY |
| W3/D10/D12 | NOT APPLICABLE | ONE BUTTON ROTARY |

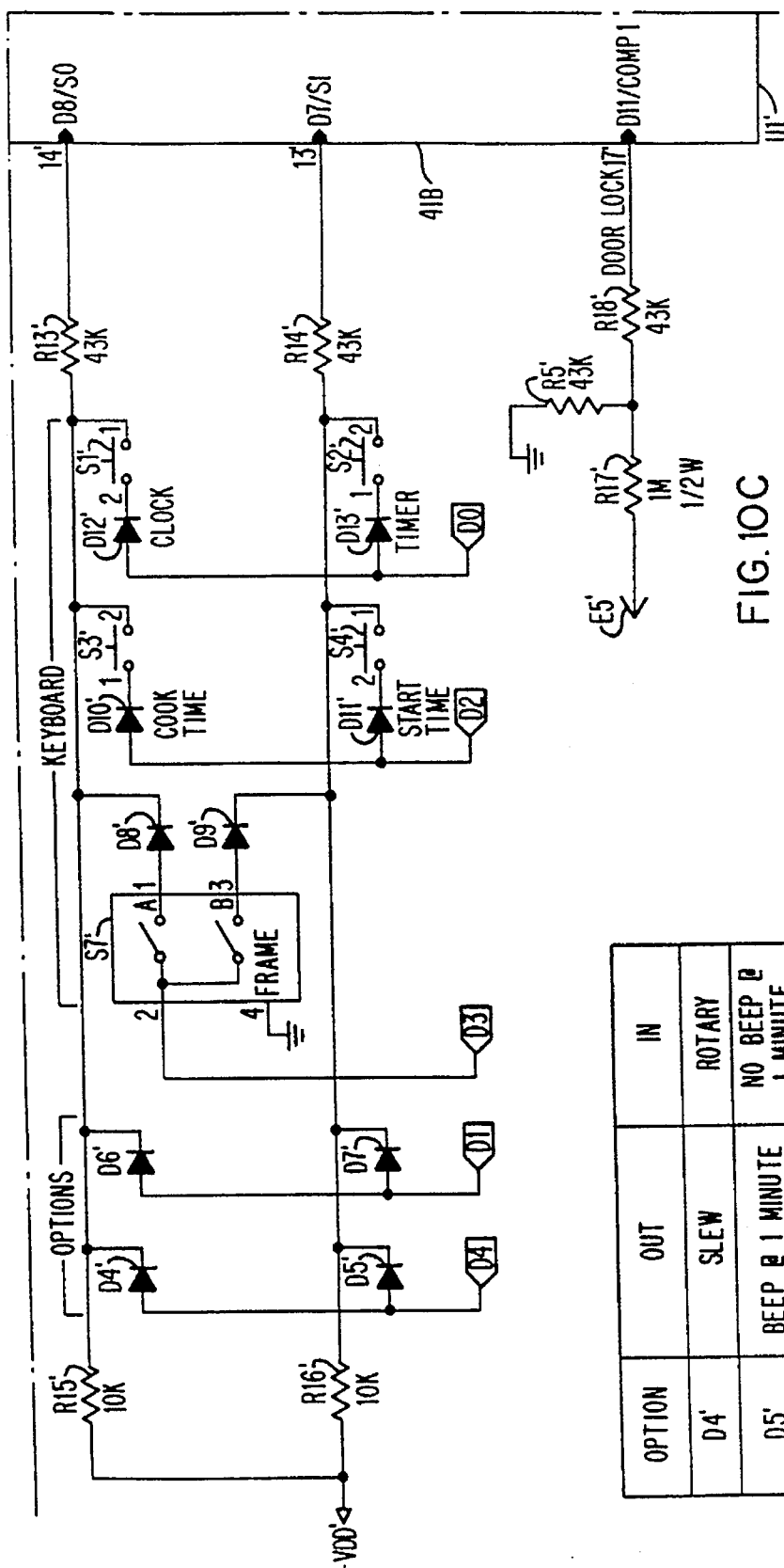

CONTROL DEVICE AND METHODS OF MAKING AND OPERATING THE SAME

This application is a division of application Ser. No. 08/022,132, filed Feb. 25, 1993, now U.S. Pat. No. 5,440,443.

BACKGROUND OF THE INVENTION

1. Field of the Invention

This invention relates to a new control device, such as a control device for a cooking apparatus or the like, as well as to new methods of making and operating such a control device.

2. Prior Art Statement

It is known to provide a control device comprising a microcomputer unit, a relay unit having coil means and contact means that is operated to one condition thereof when a direct current flows through the coil means, the relay unit having a certain voltage rating, a power supply unit for being interconnected to a high voltage alternating current supply means that has a certain frequency, and circuit means operatively interconnecting the units together, the power supply unit comprising a transformerless capacitor arrangement for creating a low voltage direct current means from the power source means to power the microcomputer unit and the coil means.

It is applicant's belief that no one has used such a transformerless capacitor arrangement for creating a first low voltage direct current for powering a microcomputer unit and a second low voltage direct current for powering the coil means of a relay unit.

SUMMARY OF THE INVENTION

It is one of the features of this invention to provide a new control-device wherein unique means are provided for operating a microcomputer unit and a coil means of a relay unit thereof.

In particular, it was found according to the teachings of this invention that the control device of applicant's copending patent application, Ser. No. 08/004,702, filed Jan. 14, 1993, U.S. Pat. No. 5,365,146, can be modified so that the power supply unit thereof comprises means for creating from the transformerless capacitor arrangement thereof a first low voltage direct current for powering the microcomputer unit and a second low voltage direct current for powering the coil means of a relay unit.

For example, one embodiment of this invention comprises a control device comprising a microcomputer unit, a relay unit having coil means and contact means that is operated to one condition thereof when a direct current flows through the coil means, the relay unit having a certain voltage rating, a power supply unit for being interconnected to a high voltage alternating current power supply means that has a certain frequency, and circuit means operatively interconnecting the units together, the power supply unit comprising a transformerless capacitor arrangement for creating a low voltage direct current means from the power source means to power the microcomputer unit and the coil means, the power supply unit comprising means for creating from the transformerless capacitor arrangement a first low voltage direct current for powering the microcomputer unit and a second low voltage direct current for powering the coil means of the relay unit whereby the first low voltage direct current and the second low voltage direct current comprise the low voltage direct current means.

It is another feature of this invention to permit such a control device to operate under certain ambient temperature conditions, such as at approximately 105° C., and not adversely affect the relay unit thereof even though the coil means thereof is being continuously operated by having a direct current passing therethrough so that the contact means thereof remain in a certain operating condition thereof.

In particular, it has been found according to the teachings of this invention that a relay unit can be powered with an initial voltage that is greater than 75% of the certain voltage rating thereof so as to reliably and rapidly operate the contact means thereof to one condition and then have the initial voltage across the coil means thereof reduced to a predetermined lower voltage that will sustain the holding of the contact means in the one condition thereof.

For example, another embodiment of this invention comprises a control device comprising a microcomputer unit, a relay unit having coil means and contact means that is operated to one condition thereof when a direct current flows through the coil means, the relay unit having a certain voltage rating, a power supply unit for being interconnected to a high voltage alternating current power supply means that has a certain frequency, and circuit means operatively interconnecting the units together, the power supply unit comprising a transformerless capacitor arrangement for creating a low voltage direct current means from the power source means to power the microcomputer unit and the coil means, the power supply unit comprising means for creating from the transformerless capacitor arrangement a first low voltage direct current for powering the microcomputer unit and a second low voltage direct current for powering the coil means of the relay unit whereby the first low voltage direct current and the second low voltage direct current comprise the low voltage direct current means, the power supply unit comprising means for creating the second low voltage direct current from the transformerless capacitor arrangement for powering the coil means with an initial voltage that is less than the certain voltage rating thereof and for then reducing that initial voltage across the coil means to a predetermined lower voltage.

Accordingly, it is an object of this invention to provide a new control device having one or more of the novel features of this invention as set forth above or hereinafter shown or described.

Another object of this invention is to provide a new method of making such a control device, the method of this invention having one or more of the novel features of this invention as set forth above or hereinafter shown or described.

Another object of this invention is to provide a new method of operating such a control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a schematic view illustrating how FIGS. 5A, 5B, 5C and 5D are to be positioned relative to each other in order to illustrate the entire control system of the control device of FIGS. 1 and 2.

FIG. 5A illustrates part of the control system of FIGS. 1 and 2.

FIG. 5B illustrates part of the control system of FIGS. 1 and 2.

FIG. 5C illustrates part of the control system of FIGS. 1 and 2.

FIG. 5D illustrates part of the control system of FIGS. 1 and 2.

FIG. 8 is a fragmentary view similar to FIG. 1 and illustrates another control device of the invention in applicant's aforementioned copending patent application that utilizes a rotary switch.

FIG. 9 is a schematic view illustrating how FIGS. 10A, 10B, 10C and 10D are to be positioned relative to each other in order to illustrate the entire control system of the control device of this invention.

FIG. 10A illustrates part of the control system of this invention.

FIG. 10B illustrates part of the control system of this invention.

FIG. 10C illustrates part of the control system of this invention.

FIG. 10D illustrates part of the control system of this invention.

FIG. 11 illustrates a chart indicating how certain of the diodes and/or jumper wires can be utilized in the control system of FIGS. 10A–10D to provide different functions of the range means thereof.

DESCRIPTION OF THE PREFERRED EMBODIMENTS

Figure 1:
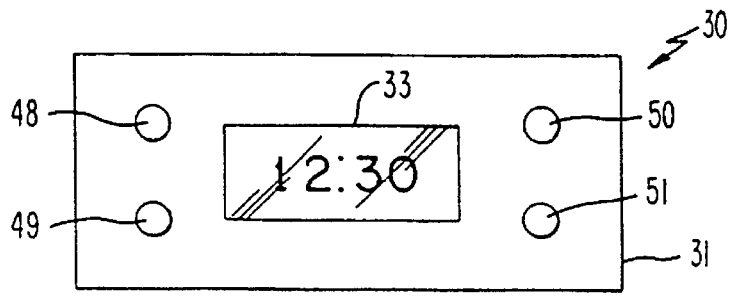
FIG. 1 is a schematic front view of the control device of applicant's copending patent application, Ser. No. 08/004,702, filed Jan. 14, 1993.

While the various features of this invention are hereinafter illustrated and described as being particularly adapted to provide a control device having a relay unit that controls a heating element of a cooking apparatus, it is to be understood that the various features of this invention can be utilized singly or in various combinations thereof to provide a control device having a relay unit for controlling other functions as desired.

Therefore, this invention is not to be limited to only the embodiments illustrated in the drawings, because the drawings are merely utilized to illustrate one of the wide variety of uses of this invention.

As previously stated, certain features of this invention have been utilized to modify the control device of applicant's aforementioned copending patent application, Ser. No. 08/004,702, filed Jan. 14, 1993, U.S. Pat. No. 5,365,146, whereby it is believed best that a full description of that control device, before being modified by the features of this invention, be first set forth in order to subsequently understand the features of this invention.

Figure 2:
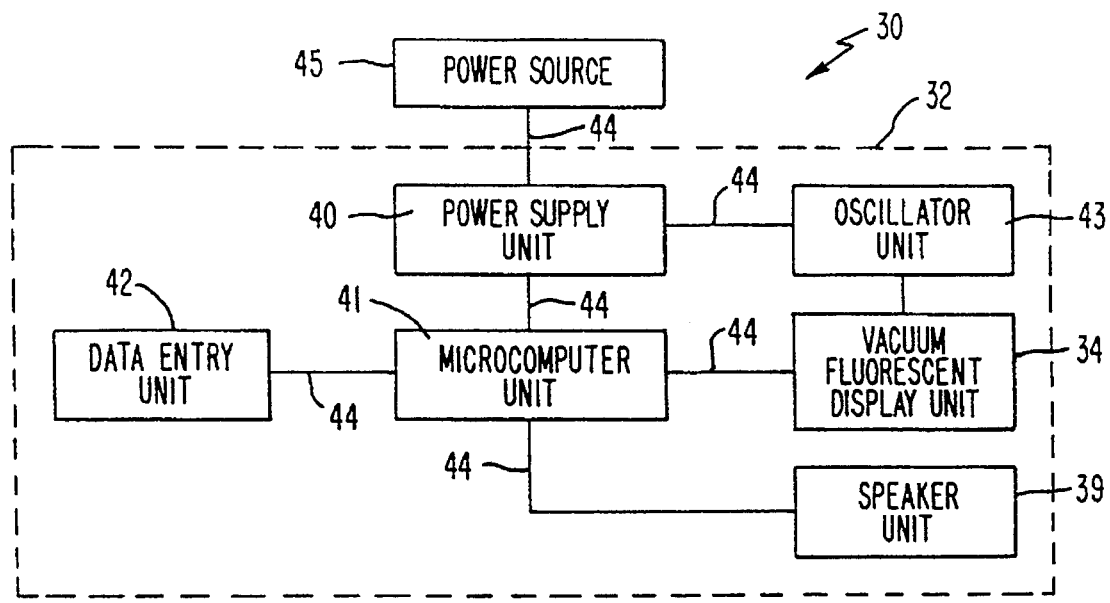
FIG. 2 is a block diagram schematically illustrating the various units of the control device of FIG. 1 and how the same are interconnected together by the circuit means of the control device.
Figure 3:
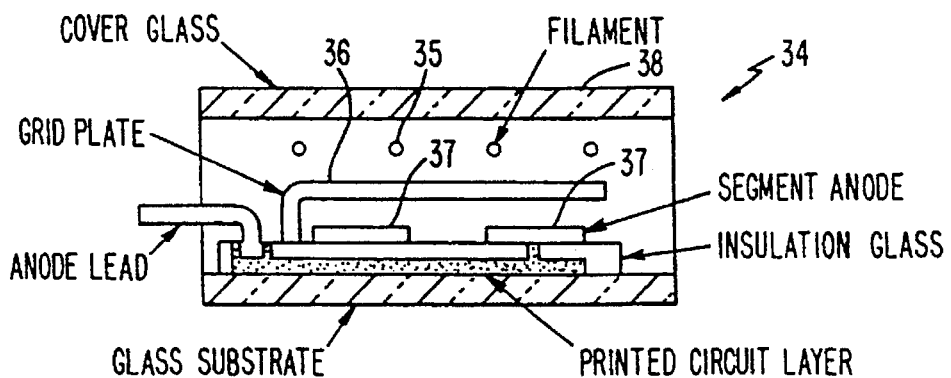
FIG. 3 is a schematic cross-sectional view illustrating the vacuum fluorescent display unit of the control device of FIGS. 1 and 2.
Figures 4, 5A:
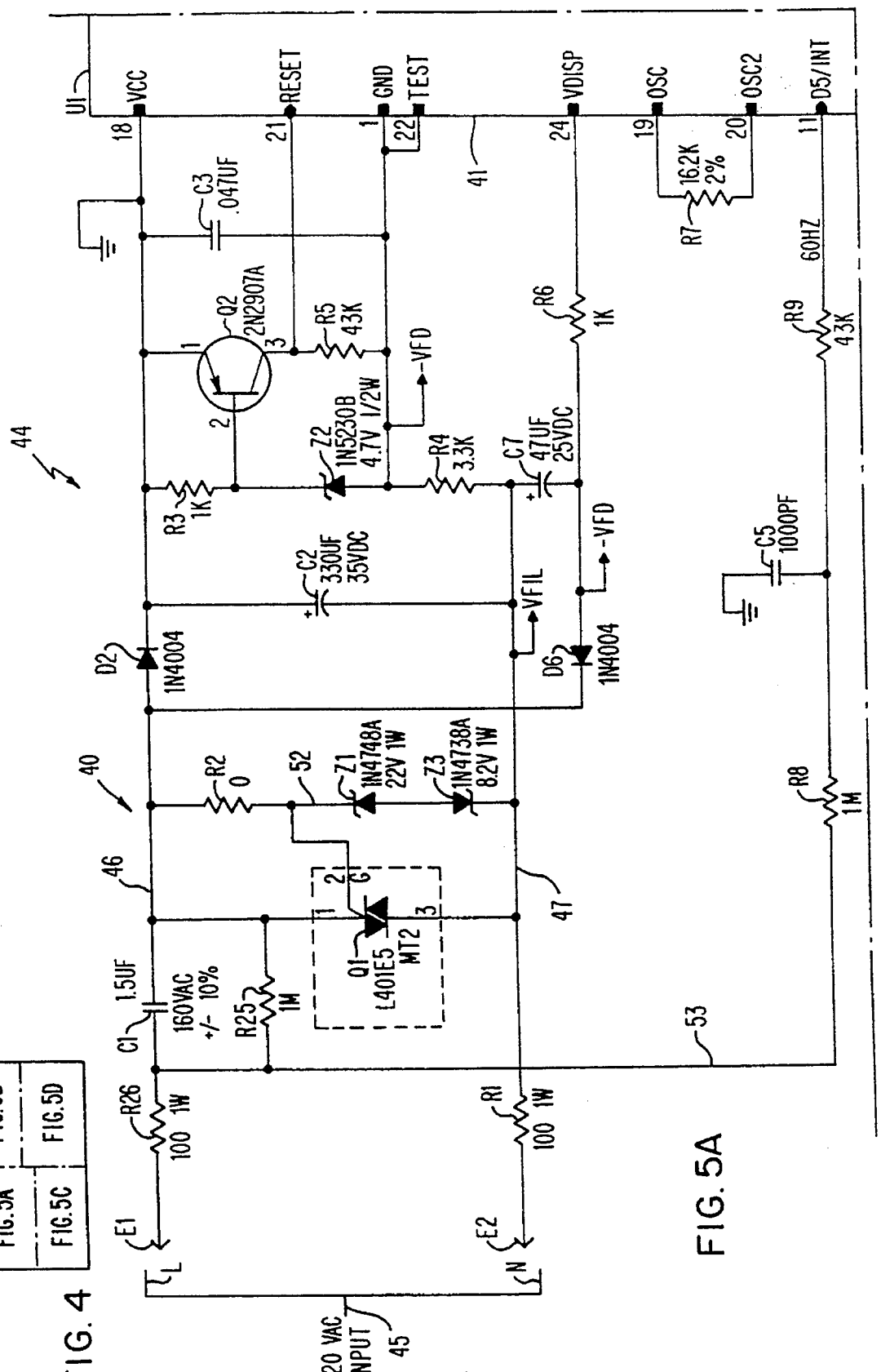
Figure 5B:
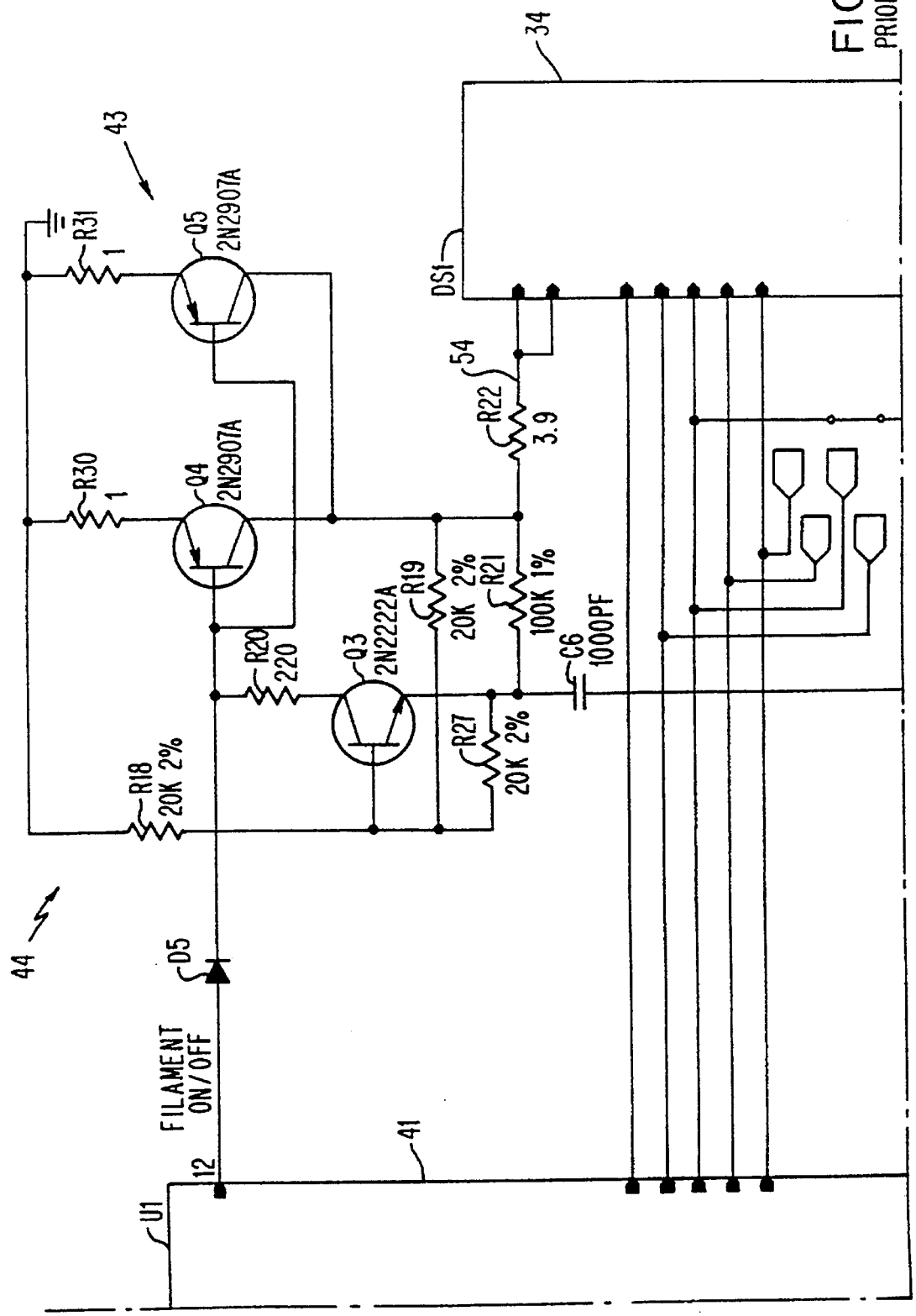

Accordingly, now referring to FIGS. 1 and 2, the control device of applicant's aforementioned copending patent application is generally indicated by the reference numeral 30 and comprises a housing means 31 that is illustrated in full lines in FIG. 1 and by a dashed box means 32 in FIG. 2, the housing means 31 having a display window 33 therein for exposing a vacuum fluorescent display unit 34 that is shown in FIG. 1 as indicating the time of day as being 12:30, shown in FIG. 2 as a block, shown in FIG. 3 in schematic cross section and shown as reference numeral 34 and reference means DS1 in FIGS. 5B and 5D.

The display unit 34 is conventional in the art and as illustrated in FIG. 3 comprises a filament means 35 that when heated by having an electrical current passed therethrough will emit electrons that pass through a grid plate 36 and collide with fluorescent material of anode segments 37 exciting the same into luminescence with either the proper time of day or the time remaining on a selected time period as the case may be to be viewed through a glass cover 38 at the window 33 of the housing means 31 in a manner well known in the art.

The control device 30 also functions as a timer wherein a certain amount of time is set into the control device 30 and when the control device 30 has run through such selected time period the control device 30 will sound an alarm, such as by operating a speaker unit 39 that is illustrated as a block in FIG. 2 and by the reference numeral 39 as well as by the reference means Y1 in FIG. 5D.

The control device 30 in addition to the vacuum fluorescent display unit 34 and speaker unit 39 as illustrated in FIG. 2 comprises a power supply unit 40, a microcomputer or microprocessor unit 41, a data entry unit 42 and an oscillator unit 43, the units 34, 39, 40, 41, 42 and 43 being interconnected together by electrical circuit means 44 that is best illustrated in FIGS. 5A–5D.

The power supply unit 40 as illustrated in FIG. 2 is adapted to be interconnected to an external power source 45 by the circuit means 44 and such power source 45 as illustrated in FIG. 5A comprises an 120 volt alternating current source that has terminals L and N adapted to be respectively interconnected to terminals E1 and E2 of the circuit means 44, the terminals E1 and E2 being respectively interconnected to lead means 46 and 47 of the circuit means 44.

The lead means 46 has a resistor R26, a capacitor C1 and a diode D2 in series therein before the lead means 46 interconnects with an inlet port VCC of the microcomputer unit 41 that is also designated U1 in FIGS. 5A–5D.

Figure 5C:
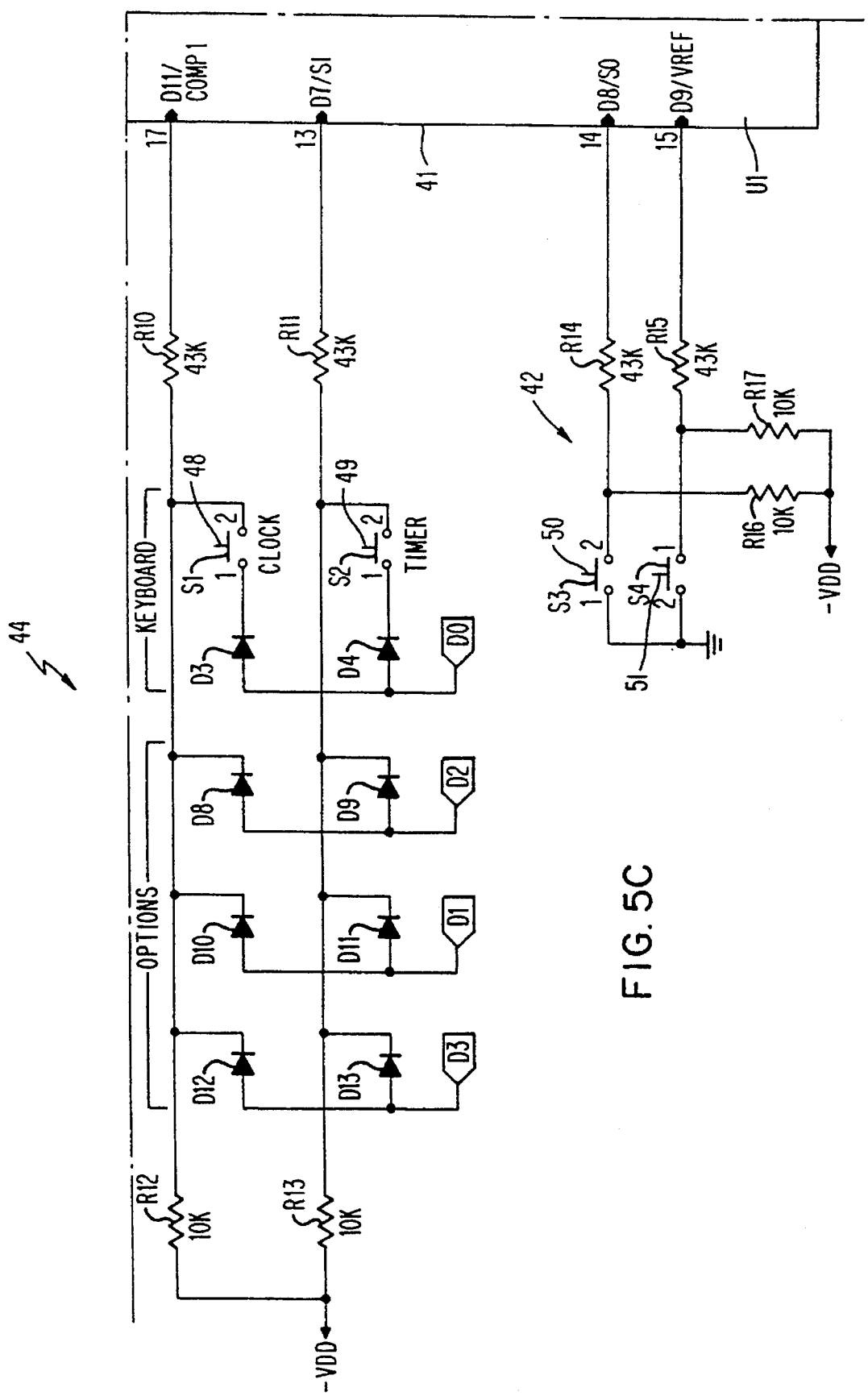
Figures 6, 7:
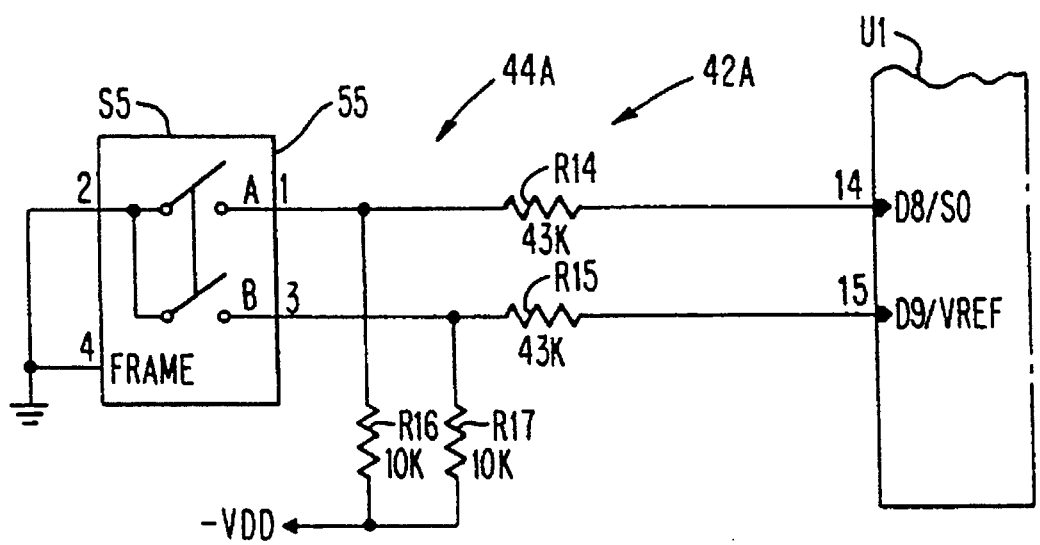
FIG. 6 illustrates a chart indicating how certain of the diodes and/or jumper wires can be utilized in the control system of FIGS. 5A–5D to provide different functions of the clock/timer means thereof.
FIG. 7 is a fragmentary view similar to FIG. 5C illustrating the control system of FIGS. 1 and 2 utilizing a rotary switch rather than the slew control switch means of FIG. 5C.

Unless otherwise specified in FIGS. 5A–5D, all diodes are 1N4148; all capacitor values are 50 V plus/minus 20%; and all resistor values are in ohms, 0.25 watt plus/minus 5% and it can be seen in the chart of FIG. 6 that certain diodes and certain jumper wires can be left out of the circuit means 44 or be disposed in the circuit means 44 to produce the various options indicated therein. However, since most of the components and the circuitry therefor illustrated in FIGS. 5A–5D are well known in the art, only the parts thereof that are necessary to understand the unique features of the control device 30 will be hereinafter set forth in detail.

Nevertheless, it can be seen in FIG. 5C that two electrical switches S1 and S2 are respectively provided with push buttons 48 and 49 which when pushed inwardly in FIG. 1 will close the respective switch S1 or S2, the switch S1 being utilized to select the setting of the time of day clock of the control device 30 and the switch S2 being utilized to select the timer option of the control device 30.

It can also be seen in FIG. 5C that two other electrical switches S3 and S4 are provided and respectively have push buttons 50 and 51 which when pushed inwardly close the respective switches S3 and S4, the switch S3 being utilized to slew up the setting for either the clock or the timer and the switch S4 being utilized to slew down the clock setting or the timer setting as the case may be and in a general manner well known in the art.

Thus, it can be seen that the switches S1, S2, S3 and S4 as well as the circuit means 44 associated therewith comprise the data entry unit 42 of the control device 30.

As illustrated in 5A, the power supply unit 40 of the circuit means 44 not only comprises the lead means 46 with the resistor R26, the capacitor C1 and the diode D2, but also the lead 47 that has a resistor R1 therein, a resistor R25 arranged in parallel with the capacitor C1 and a branch lead means 52 between the lead means 46 and 47 and having a resistor R2 therein with zener diodes Z1 and Z3 in series therewith as illustrated.

The circuit means 44 for the power supply unit 40 includes a capacitor C2, a zener diode Z2, resistors R3, R4, R5 and R6, capacitors C3 and C7, diode D6 and transistor Q2 all arranged as illustrated and having the values as indicated.

In addition, a triac Q1 is utilized in the power supply unit 40 as illustrated in FIG. 5A to permit the control device 30 to be utilized with other power source means that have a different voltage and/or frequency such as 50 or 60 hertz, and such as 240 volts, 220 volts or 100 volts rather than the standard house current of 120 volts AC that has a frequency of 50 or 60 hertz.

However, the circuit means 44 when connected to the 120 volt AC source 45 functions in a like manner whether the triac Q1 is in the circuit means 44 or out of the same.

In particular, it can be seen that the power supply unit 40 for the control device 30 is a transformerless capacitor arrangement that limits the AC input voltage from the power source 45 by a series circuit combination of the two resistors R26 and R1, the capacitor C1 and the two zener diodes Z1 and Z3, the two resistors R1 and R26 acting like a fuse if an overvoltage condition should occur. The line capacitor C1 exhibits a capacitive reactance whereby most of the line voltage is dropped across the capacitor C1. The zener diodes Z1 and Z3 are configured as a voltage limiter and regulate the voltage applied to the control device 30 whereby with respect to the anode of the zener diode Z3, the output across the zener limiter is a square wave of +22 and −8.2 volts, the frequency being dependent on the AC line input signal. The +22 volt portion of the square wave signal is passed through the diode D2 and filtered by the capacitor C2 and is used as VCC for powering the microcomputer 41.

The zener diode Z2 produces a +17 voltage level across the resistor R4 with respect to the anode of the zener diode Z3. The 17 volt level is used as -VDD for the system ground reference for all of the MOS circuitry.

The −8.2 volt portion of the input square wave signal is passed through the diode D6 and filtered by the capacitor C7. When referencing -VDD, the system ground, the −8.2 volts adds to the +17 volt level creating -VFD which is the display reference for the microcomputer 41. The supply -VFD is used for the anode and the gate control of the display unit 34. The anode of the zener diode Z3 or as indicated as -VFIL is used as the filament voltage of the display unit 34 in a manner hereinafter described and is approximately −22 volts with respect to VCC.

The reset circuitry for the microcomputer 41 comprises the transistor Q2, the bias resistors R3, R4 and R5 and the zener diode Z2.

The microcomputer 41 monitors the power source 45 by utilizing a line detect circuitry comprising a lead means 53 interconnected to the lead means 46 intermediate the resistor R26 and the capacitor C1 and having resistors R8 and R9 therein and a filter capacitor C5 while being interconnected to the microcomputer input port D5/INT.

The oscillator circuit for the control device 30 consists of an external resistor R7 as illustrated in FIG. 5A, the resistor R7 being used to set the operating frequency for the microcomputer 41 in a manner well known in the art.

The oscillator unit 43 for the control device 30 is best illustrated in FIG. 5B and comprises transistors Q3, Q4, Q5, capacitor C6, resistors R18, R19, R20, R21, R22, R27, R30 and R31 and diode D5 all arranged by the circuit means 44 as illustrated. Display enable is controlled by the microcomputer 41 as a logic 1 on output pin 12 of the microcomputer 41 will reverse bias the emitter base junctions for both transistors Q4 and Q5 turning the display unit 34 off. Thus, should the microcomputer 41 determine that the power source means 45 ceases to exist by monitoring the same at the input pin D5/INT thereof, the microcomputer 41 will go to logic 1 at pin 12 to turn off the display unit 34 and thereby conserve the energy that was stored in capacitor C2 for the use of power to only the microcomputer 41.

One end means (not shown) of the filament means 35 of the display unit 34 is interconnected to the direct current VFIL by a lead means 53' as illustrated in FIG. 5D while the other end means (not shown) of the filament means 35 is interconnected by a lead means 54 to the transistors Q3, Q4 and Q5 as illustrated in FIG. 5B.

The oscillator unit 43 is adapted to pulse the direct voltage VFIL through the filament means 35 at a high frequency that is greater than the frequency of the power source 45 so as to eliminate any figure flutter at the windows 33 of the control device 30.

In particular, it can be seen that the transistors Q4 and Q5 are connected in parallel and the pulsing current mode for filament heating is controlled by the oscillator circuit of the transistor Q3.

The base oscillating circuit of the transistor Q3 triggers the bases of the transistors Q4 and Q5 for a 1.1 USEC duration at a 47 USEC rate which in turn drives the filament source of the same duration and rate. This is accomplished through a separate charge and discharge path for the capacitor C6.

Initially, with no charge on the capacitor C6, the transistor Q3 will saturate via the resistors R18 and R19 bias, with reference to source -VFIL through the resistor R21 and the filament load. With the transistor Q3 "on" or saturated, the capacitor C6 is charged via the resistors R30 and R31 and the base emitter junctions of the transistors Q4 and Q5, all in series with the resistor R20. The total charge time for the capacitor C6 is approximately 1.1 USEC. As the capacitor C6 charges, the emitter base junction of the transistor Q3 becomes reverse biased forcing the transistor Q3 into cutoff. With the transistor Q3 "off", the discharge path for the capacitor C6 is (the resistor R27 plus the resistor R19) the resistor R21 all in series with the filament load. If power were to be removed, the capacitor C6 would completely discharge. However, because the bias on the base of the transistor Q3 is approximately −10 volts, the transistor Q3 will resaturate when the capacitor C6 discharges to a potential of approximately 0.6 of a volt less than the base bias. This partial discharge requires approximately 47 USEC or one and one-half time constants.

Thus, it can be seen that the filament means 35 will be heated by a high frequency DC pulse therethrough which is at a frequency that exceeds 20 kilohertz so as not to create a human hearing problem and to eliminate the afore-mentioned figure flutter problem, the DC voltage of −22 volts RMS being applied to lead meats 53' at one end means of the filament means 35 being reduced to approximately 2.9 volts through the filament means 35 by the oscillator unit 43 as previously described.

One of the advantages of utilizing the oscillator unit 43 in combination with the transformerless capacitor arrangement of the power supply unit 40 is that the filament means 35 of the display unit 34 is heated from a very stable source of power and the consistency from control unit 30 to control unit 30 of how the temperature to which the filament means is heated is under better control which results in longer life display. Another advantage of this high frequency pulse method is that the display unit 34 has a more attractive appearance because the rapid frequency of the signal does not result in unavoidable display flicker.

Another advantage is that the control device 30 has a more protected circuit, i.e., is more removed from any of the problems that can be caused by line transients, lightning strikes and adverse things on the incoming power source 45.

As previously stated, one of the purposes of the triac Q1 in the power supply unit 40 is to get rid of excess energies that may be produced by the power source 45 in a manner that does not produce excessive heat of the control unit 30. The advantage of this is that a simple design is provided without a large heat sink and the control device 30 may be rated to operate in an ambient of 105° C. which is a present standard requirement of the appliance industry.

Also, by utilizing the triac Q1 in the power supply unit 40, the control device 30 could be plugged literally anywhere into any power source in the world and all that would be required is that the resistor R2 be changed to a 1K resistor and that the capacitor C1 would have to be appropriately rated to take the highest voltage available so that its voltage rating would have to be appropriate through the highest voltage that it would ever see and on the low end its capacitance value would have to be high enough that it would supply adequate power to operate the control device 30 properly. Once having met that requirement, the triac Q1 would still perform the function of getting rid of any excess energy that the control device 30 does not need and it does so in an efficient manner that does not produce a lot of heat.

It is well known that one desirable characteristic of an electronic control is that if there is a power interruption, the control device does not immediately reset the microprocessor or microcomputer forcing the user to reprogram whatever information may have been in the control device at the time the power dies, there being a kind of industry target for setting this for at least 5 seconds or more which supposedly handles a great deal of the typical power interruptions that may occur.

The control device 30 utilizes the microcomputer 41 to sense when power has been interrupted by monitoring the input pin 11 in which the incoming AC line voltage is being sensed and when the microcomputer 41 detects that the signal is no longer present, the microcomputer 41 forces a logic high on the output pin 12 which is coupled through diode D5 into the base emitter junctions of the transistors Q4 and Q5 to stop the circuit from oscillating immediately and thereby not consuming any more power from that point on. Thus, the energy stored in the capacitor C2 is conserved for use by the microprocessor 41. This greatly extends the time period that the microprocessor 41 can stay alive.

When one desires to set the clock of the control device 32, that person pushes inwardly on the button 48 so as to close the clock switch S1 and then pushes on the button 50 to close the switch S3 and thereby slew up the time setting of the clock of the timer to the desired time thereof. Alternately, the button 51 is pushed inwardly to close the switch S4 to slew down the time on the timer to the desired time.

To set the timer, a person pushes inwardly on the button 49 to close the switch S2 and then pushes in on the button 50 to slew up the timer setting that appears at the display unit 34 until the desired time period is reached. Should a person overshoot the desired time period, the button 50 can be released and then the button 51 pushed inwardly to close the switch S4 and thereby slew down the indicated time period to the desired time period.

Such operation of setting a clock and timer is a procedure well known in the art.

However, instead of using two switches S3 and S4, a single rotary switch can be used for such purpose. For example, reference is now made to FIGS. 7 and 8 wherein another control device 30A of applicant's copending patent application is illustrated and parts thereof that are similar to the parts of the control device 30 are indicated by like reference numerals followed by the reference letter "A".

As illustrated in FIGS. 7 and 8 the control device 30A has a rotary switch 55 that is also designated S5 in FIG. 7 and is utilized to increase the indicated time when rotated in one direction or decrease the indicated time when rotated in the other direction in a manner well known in the art. For example, see the U.S. patent to Fowler, U.S. Pat. No. 4,777,483 whereby this U.S. patent is being incorporated into this disclosure by this reference thereto whereby a further discussion of the operation of the rotary switch S5 is deemed unnecessary.

As previously stated, one of the features of this invention is to modify the control device 30 previously described so that the same is adapted to operate a relay unit in a unique manner.

Figures 9, 10A:
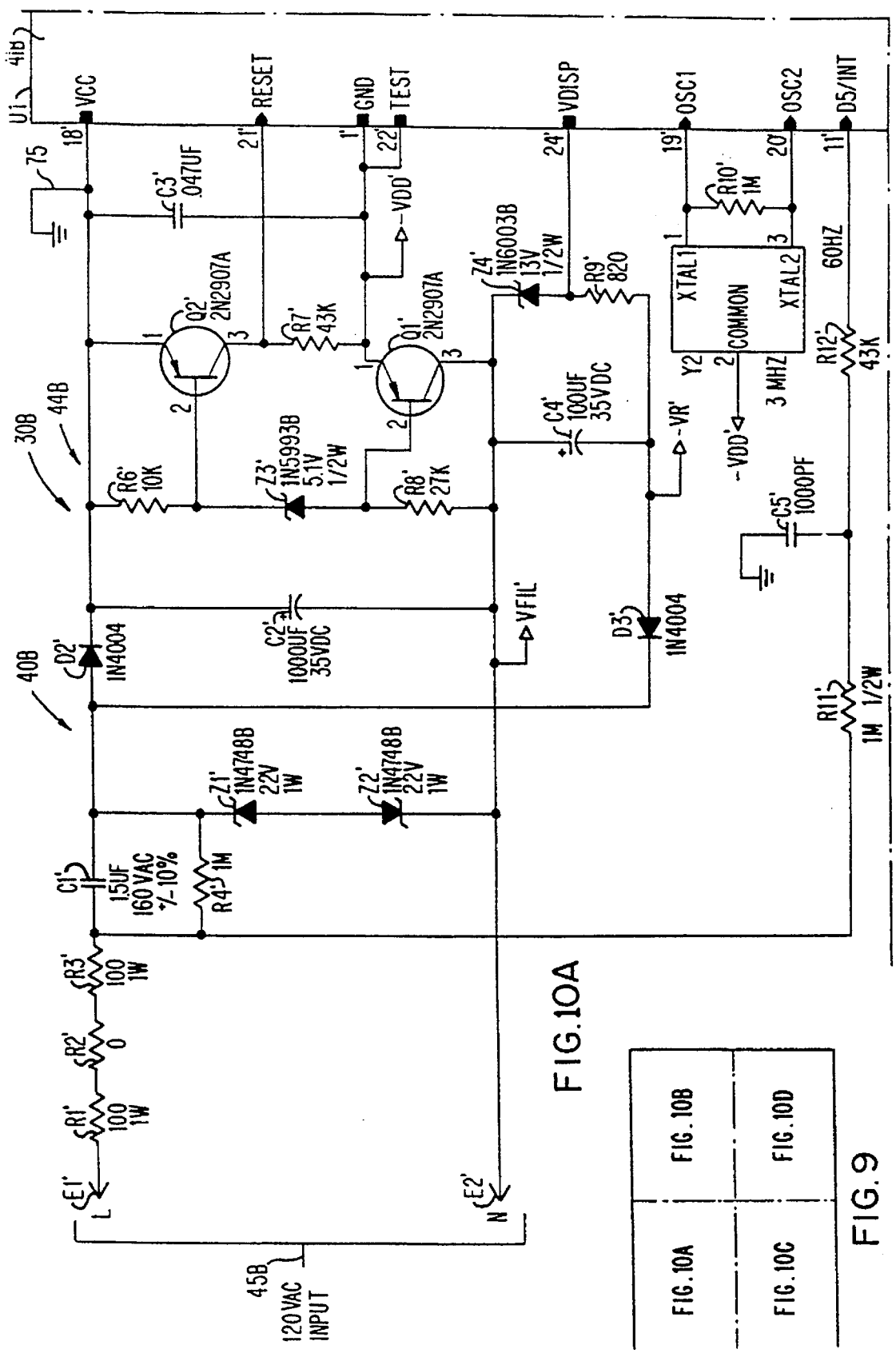
Figure 10B:
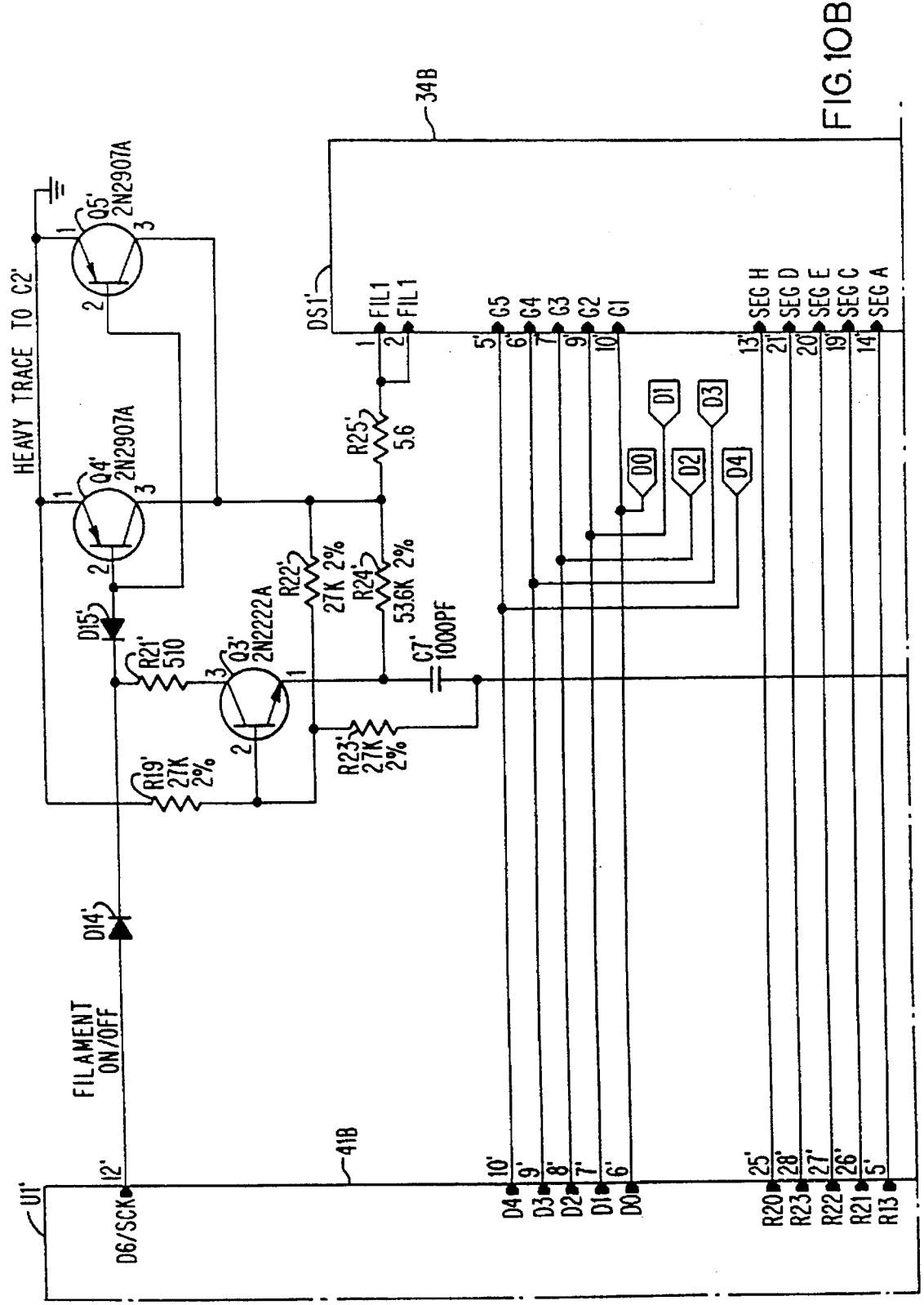
Figure 10D:
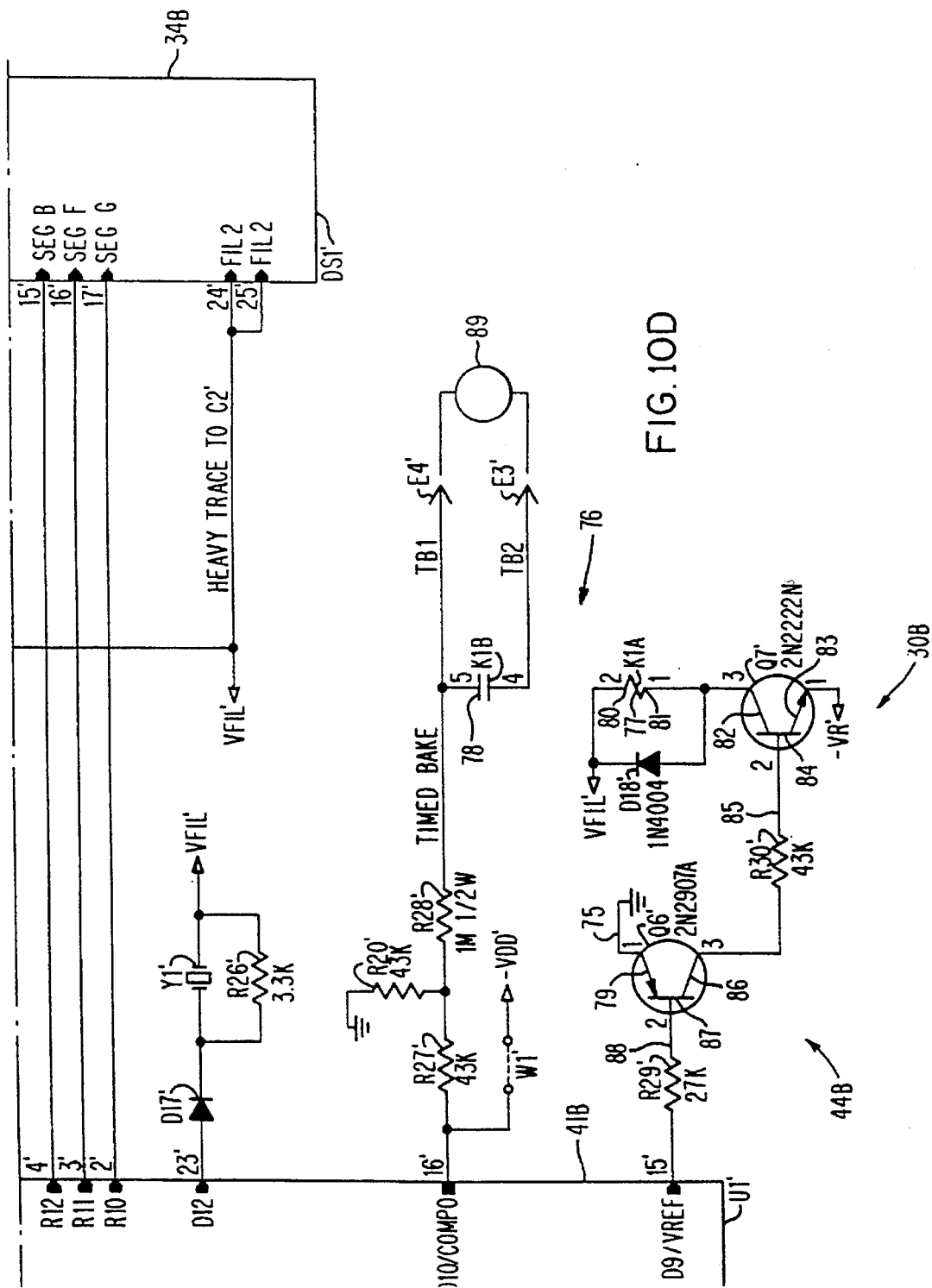

Accordingly, reference is now made to FIGS. 9–11 wherein the new control device of this invention is generally indicated by the reference numeral 30B and parts thereof similar to the parts of the control devices 30 and 30A are indicated by like reference numerals followed by the reference letter "B" except that the various reference indicators for the resistors, capacitors, zener diodes, diodes, transistors and power sources as illustrated in FIGS. 10A–10D will be followed by a prime mark and may be the same as or different than those set forth in FIGS. 5A–5D with the understanding that, unless otherwise specified, all of the reference characters hereinafter described apply only to the new control device 30B of this invention as set forth in FIGS. 9–11.

In addition, unless otherwise specified in FIGS. 10A–10D all diodes are 1N4148; all capacitor values are 50 V, plus/minus 20%; and all resistor values are in ohms 0.25 watt plus/minus 5% and it can be seen from the chart of FIG. 11 that certain diodes, certain resistors, certain capacitors and certain jumper wires can be left out of the circuit means 44B of the control device 30B or be disposed in the circuit means 44B to produce the various options indicated in such chart. However, since most of the components and circuitry thereof illustrated in FIGS. 10A–10D are well known in the art, only the parts thereof that are necessary to understand the unique features of the control device 30B of this invention will be hereinafter set forth in detail and the components and circuitry thereof basically correspond to the circuit means 44 previously described in FIGS. 5A–5D for the control device 30.

Referring now to FIGS. 10A–10D, the circuit means 44B of the control device 30B is generally the same as the circuit means 44 for the control device 30 previously described except that it can be seen in the power supply unit 40B of the control device 30B as illustrated in FIG. 10A, the zener diode Z2' (zener diode Z3 in FIG. 5A) has been changed to a 22 volt one watt zener diode, the capacitor C4' (C7 in FIG. 5A) has been changed to a 100UF35 volt DC capacitor and a zener diode Z4' has been added in series with the resistor R9' (R6 in FIG. 5A) which has been changed to 820 ohms and leads to the microcomputer unit 41B or U1' at an input pin 24' thereof whereby the second low voltage direct current source -VR' (designated -VFD in FIG. 5A) that is created from the capacitor C1' will be initially a −22 volt source as will be apparent hereinafter because the zener diode Z2' breaks over at 22 volts. However, the first low voltage direct current source VFIL' that is created by the capacitor C1' with respect to the circuit common point 75 is a plus 22 volt source in the same manner that the capacitor arrangement C1 of FIG. 5A created the low voltage direct current source VFIL of FIG. 5A to operate the vacuum fluorescent display unit 34B of FIGS. 10B and 10D in the same manner and need not be further described.

In addition, it can be seen in FIG. 10D that a relay unit that is generally indicated by the reference numeral 76 is provided for the control device 30B and comprises a relay coil means that is designated as 77 or K1A and a contact means that are operated by the coil means 77 and is designated as 78 or K1B, the contact means K1B normally being in an open condition as long as a direct current means is not passed through the coil means 77 and will close or be pulled in when a sufficient direct current means is passed through the coil means 77 in a manner well known in the art for the operation of a relay unit.

In one working embodiment of the control device 30B illustrated in FIG. 10D, the relay unit 76 has a certain voltage rating of 24 volts, i.e. the relay unit 76 is normally to be operated by passing a direct current voltage of approximately 24 volts through the coil means 77 to cause the contact means 78 to close and is formed of materials that are rated for approximately 155° C., i.e. the relay unit 76 will not have the materials forming the same breakdown as long as the temperature of the same never exceeds a temperature of approximately 155° C.

The circuit means 44B of the control device 30B that incorporates the relay unit 76 therein comprises resistors R29' and R30' and transistors Q6' and Q7' arranged as illustrated in FIG. 10D together with a diode D18' and having the circuit common point 75 interconnected to the emitter 79 of the transistor Q6', the direct current voltage source VFIL' of approximately 0 volts or neutral interconnected to one side 80 of the coil means 77 while the other side 81 of the coil means 77 is interconnected to the collector 82 of the transistor Q7'.

The emitter 83 of the transistor Q7' is interconnected to the direct current source -VR' while the base 84 thereof is interconnected by a lead means 85 to the collector 86 of the transistor Q6', the lead means 85 having the resistor R30' therein.

The transistor Q6' has the base 87 thereof interconnected to an output port of the microcomputer unit 41B by a lead means 88 that has the resistor R29' therein.

The contact means 78 of the relay unit 76 are interconnected to terminals E3' and E4' of the control device 30B and control the operation of a heating element 89 illustrated in FIG. 10D in a manner well known in the art whereby the heating element 89 is placed across a suitable high voltage alternating current source when the relay contact means 78 are closed and is removed from such high voltage alternating current source when the relay contact means 78 are opened, the heating element means 89 also only being operated not only when the contact means 78 are closed but also requiring an output signal from the output port 16' of the microcomputer 41B in a manner well known in the art.

In the particular working embodiment of the control device 30B of this invention, the heating element 89 is a bake heating element of a cooking apparatus (not shown) and is only turned on by the microcomputer unit 41B at a particular time of the day that has been set by a selector switch means S4' of FIG. 10C all in a manner well known in the art for range timers wherein the same controls a relay unit to turn on a heating element of a cooking apparatus at a certain start time as set by a selector switch, such as the selector switch S4'0 of FIG. 10C, when the clock means of the control device reaches that selected time.

Referring now to FIG. 5A, the power supply unit 40 created a first low voltage direct current source at VFIL of approximately 22 volts and a second low voltage direct current source of approximately −8.2 volts as indicated by -VFD in FIG. 5A.

However, this invention uniquely has changed that −8.2 volt source -VFD of FIG. 5A to approximately −22 volts as indicated by the source -VR' of FIG. 10A so as to uniquely operate the relay unit 76 and still have the relay unit 76 operate effectively even when the ambient temperature of the control device 30B reaches 105° C. as required by certain appliance manufacturers.

In particular, as was previously stated, the zener diode Z3 of FIG. 5A was changed to the zener diode Z2' of FIG. 10A which is a 22 volt 1 watt zener diode so that −22 volts is created at -VR and since such −32 volts is too large a voltage to be applied to the input pin 24' of the microprocessor unit 41B, the components Z4' and R9' are utilized to reestablish a lower voltage than 22 volts for the microprocessor processor unit 41B. Thus, it can be seen that the circuit means 44B effectively places the arrangement of the zener diode Z4' and resistor R9' in parallel with the zener diodes Z1' and Z2' and thereby reduce the power consumption in each zener diode Z1' and Z2' because they are sharing the same amount of power and thereby reduces the amount of operating temperature of the two zener diodes Z1' and Z2'.

If desired, the triac Q1 of FIG. 5A can be used in the power supply unit 40B of the control device 30B and such triac Q1 would function in the manner previously described.

The transformerless capacitor arrangement of the capacitor C1' of the control device 30B of this invention utilizes the capacitor C2' as the energy storage capacitor for the first low voltage direct current source which is a positive 22 volt supply between the points VFIL' and the circuit common point 75 whereas the capacitor C4' is the energy storage capacitor for the second low voltage direct current source that comprises a negative 22 volt supply between the points -VR' and VFIL'. Accordingly, this makes a difference in potential from the point marked circuit common 75 to the point marked -VR' of approximately 44 volts. However, the microprocessor unit 41B is not able to withstand 44 volts on its inputs whereby some level shifting is needed and that is accomplished by using the transistors Q6' and Q7' and the associated resistor components R29' and R30'.

For example, when the software of the microcomputer unit 41B dictates that the relay unit 76 should be turned on, the output pin 15' of the microcomputer unit 41B is driven to a negative 5 volt potential and thereby establishing the base emitter current for transistor Q6' and causing its collector 86 to allow current flow to the most positive point in the circuit which is labeled as circuit common 75 and is approximately a positive 22 volts. The current is limited by the resistor R30' which is connected to the base emitter junction of transistor Q7' which has its emitter 83 tied to the –22 supply -VR'. Therefore, about roughly one millamp of current flows through the resistor R30' into the base emitter of the transistor Q7' and this in turn causes the collector 82 of the transistor Q7' to supply a direct current through the coil means 77 of the relay unit 76 from the -VR' supply to the point marked VFIL' which is neutral or 0 volts.

At the instant the relay unit 76 is turned on in the manner previously set forth, approximately 22 volts that is stored in the energy storage capacitor C4' is applied across the coil means 77 of the relay unit 76 and is sufficient to allow the relay unit 76 to rapidly and reliably pull in or close the contact means 78 even though the relay unit 76 is rated for approximately 24 volts.

However, if the microcomputer unit 41B determines that the relay unit 76 is to continue in its "on" condition, the current required for the relay unit 76 to maintain 22 volts across the relay coil means 77 exceeds the ability of the capacitor C1' of the power supply unit 44B of the control device 30B and exceeds the ability of the capacitor C1' to supply such current so that a quiescent balancing state is established in which the voltage across the capacitor C4' falls to a level at which the capacitor C1' can supply and matches the voltage now across the coil means 77 of the relay unit 76 so as a practical matter, the voltage falls to roughly two-thirds of its initial applied voltage and that is approximately 15 volts which is sufficient to maintain the relay unit 76 in its pulled in condition as long as that 15 volts is supplied across the coil means 77 of the relay unit 76 by the combination of the capacitor C1' and the storage capacitor C4' operating in the aforementioned manner.

The advantage provided by such an arrangement is that relay reliability is maintained by initially providing adequate voltage to rapidly pull in the contact means 78 thereof and then self-heating of the relay unit 76 is minimized in the relay coil means 77 thereof because after the relay unit 76 is pulled in, the current falls to a sustaining level which is more than adequate to keep the contact means 78 closed once they are already pulled in and, therefore, the coil means 77 heats less through self-heating. Thus, it takes a higher ambient operating temperature to exceed the rated temperature of the materials from which the relay unit 76 is constructed and so that in this case, where the materials are rated for approximately 155° C., the self-heating is probably reduced by roughly 15° C. to approximately 20° C. over what the rise would have been had full voltage been left applied to the relay unit 76. Testing has shown that approximately 25 amps can be run through the closed contact means 78 of the relay unit 76 and operate the control device 30B at approximately 105° C. and still not exceed the operating limitations of the relay unit 76.

Therefore, it can be seen that the control device 30B of this invention operates in such a manner that the power supply unit 40B creates the second low voltage direct current -VR' from the transformerless capacitor arrangement C1' for powering the coil means 77 of the relay unit 76 with an initial voltage that is less than the certain voltage rating of the relay unit 76 and then for reducing that initial voltage across the coil means 77 to a predetermined lower voltage. In the one working embodiment of the control device 30B previously described, the initial low voltage direct current that is supplied to the relay unit 76 is approximately 22 volts whereas the relay unit 76 has a certain voltage rating of approximately 24 volts, and the predetermined voltage for sustaining the operation of the coil means 77 once the relay unit 76 has been pulled in is approximately 15 volts.

It has been found that in the one working embodiment of this invention, the display means 34B of the control device 30B does not have the indicating numerals thereof flutter or flicker each time the relay unit 76 is turned on or pulled in as in the prior known unit.

In view of the above, it can be seen that this invention not only provides a new control device, but also this invention provides a new method of making such a control device and a new method of operating such a control device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A method of generating a direct current relay coil drive signal, comprising the steps of:

generating a DC voltage signal from an AC source in a power supply having a first capacitor connected in series with a first input of the AC source and a second capacitor connected between two outputs of said power supply;

activating a relay by connecting a relay coil across the outputs of said power supply; whereby said power supply, in combination with said relay coil, are configured such that an output level of said power supply is at a first voltage level before the step of activating and the step of connecting results in a parallel connection of the second capacitor and the relay coil, permitting discharge of said second capacitor and causing the output of the power supply to move to a second voltage level, wherein said second voltage level is lower than said first voltage level.

2. A method according to claim 1, further comprising the steps of:

regulating the voltage output of the power supply;

generating a second DC voltage signal in said power supply with a second voltage regulator; and powering a microprocessor with said second DC voltage signal.

3. A method according to claim 1, wherein said first voltage level is approximately 22 volts and said second voltage level is approximately 15 volts.

4. A method for powering a microprocessor and a relay coil, comprising the steps of:

converting an AC power source to a first voltage signal at a first voltage level and powering a microprocessor with the first voltage signal;

converting said AC power source to a second voltage signal and powering a relay coil with said second voltage signal, whereby connection of the relay coil to said second voltage signal alters an output impedance of a power supply converting said AC power source to said second voltage signal and automatically lowers an initial output voltage of said second voltage signal across the relay coil.

5. A method according to claim 4, wherein the steps of converting are performed by a transformerless power supply with series and parallel capacitors.

6. A method for powering a microprocessor and a relay coil, comprising the steps of:

converting a first AC power source to a first voltage signal at a first voltage level and powering a microprocessor with the first voltage signal;

converting a second AC power source to a second voltage signal and powering a relay coil with said second voltage signal, whereby connection of the relay coil to said second voltage signal alters an output impedance of a power supply converting said second AC power source to said second voltage signal and automatically lowers an initial output voltage of said second voltage signal across the relay coil.

* * * * *